No. 720,587. PATENTED FEB. 17, 1903.
J. P. HOOPS.
ADJUSTABLE CLOD CUTTER AND PULVERIZER.
APPLICATION FILED OCT. 29, 1902.
NO MODEL. 2 SHEETS—SHEET 1.
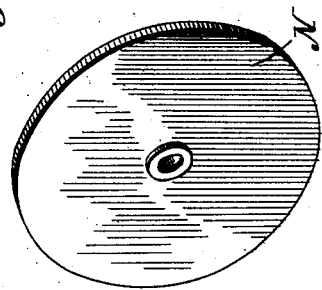
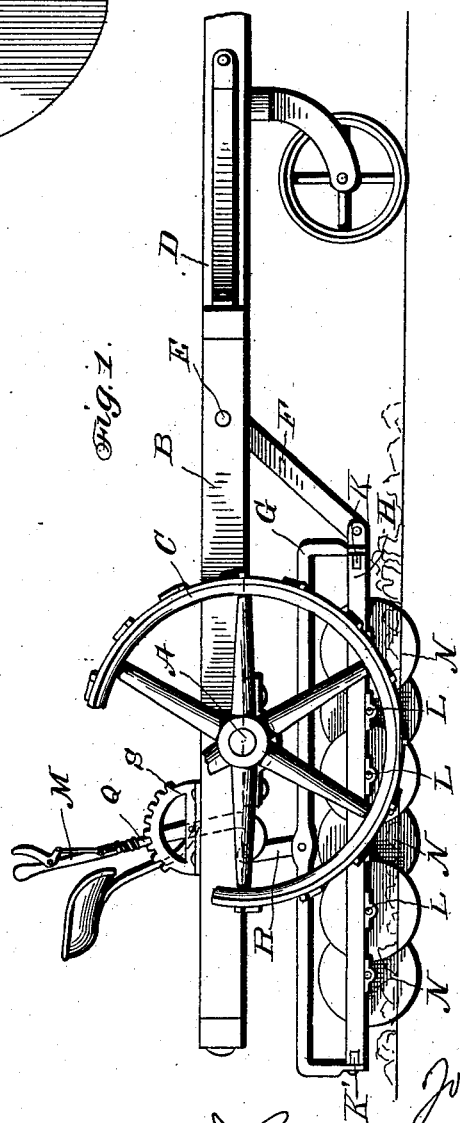

No. 720,587. PATENTED FEB. 17, 1903.
J. P. HOOPS.
ADJUSTABLE CLOD CUTTER AND PULVERIZER.
APPLICATION FILED OCT. 29, 1902.
NO MODEL. 2 SHEETS—SHEET 2.
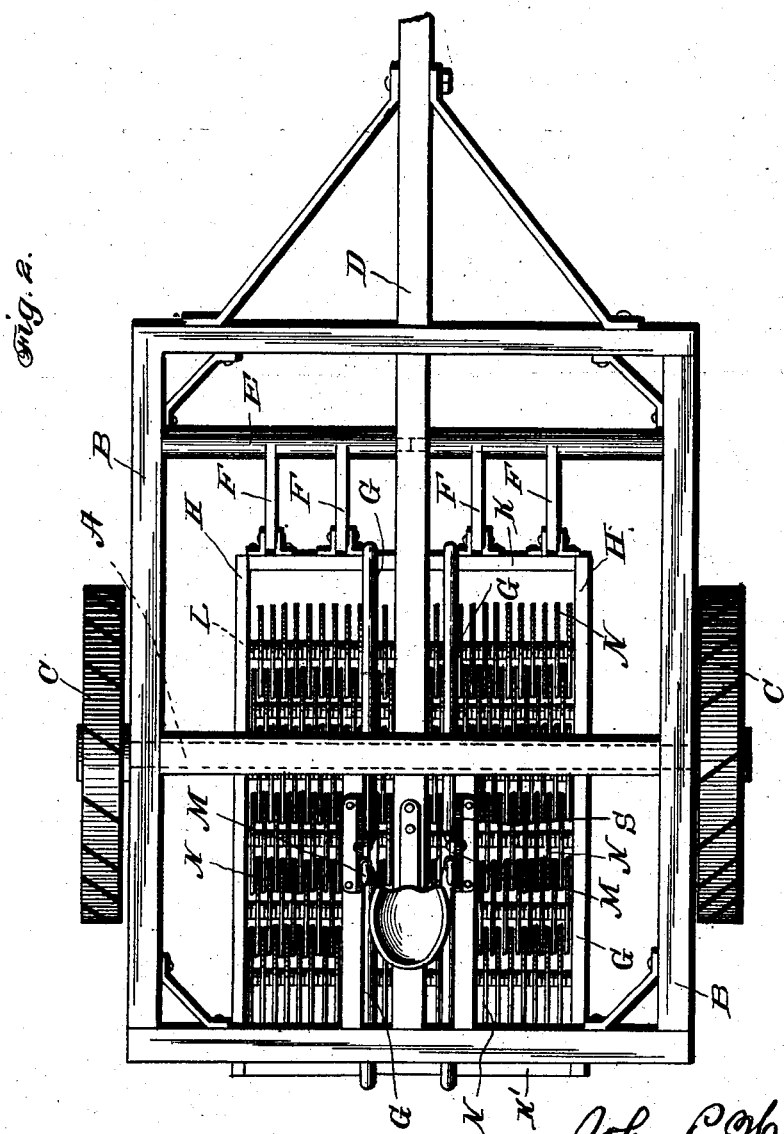

UNITED STATES PATENT OFFICE.

JOHN P. HOOPS, OF HALSTEAD, KANSAS.

ADJUSTABLE CLOD-CUTTER AND PULVERIZER.

SPECIFICATION forming part of Letters Patent No. 720,587, dated February 17, 1903.

Application filed October 29, 1902. Serial No. 129,277. (No model.)

*To all whom it may concern:*

Be it known that I, JOHN P. HOOPS, a citizen of the United States, residing at Halstead, in the county of Harvey and State of Kansas, have invented certain new and useful Improvements in Adjustable Clod-Cutters and Pulverizers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in agricultural implements, and especially in the provision of a pulverizer and clod-cutter adapted for use in thoroughly harrowing soil and cutting clods instead of crushing the same, as is commonly the result with machines now in use.

More specifically, the invention consists in the provision of a truck having a shaft journaled therein which is provided with integral arms which are adapted to be pivotally connected to a vertically-adjustable frame carrying colter-disks, means being provided for raising and lowering the colter-frame, whereby the disks or colters may be made to work at different depths in the soil.

The invention consists, further, in various details of construction and combinations of parts, which will be hereinafter more fully described and then specifically defined in the appended claim.

My invention is clearly illustrated in the accompanying drawings, which, with the letters of reference marked thereon, form a part of this application, and in which drawings similar letters of reference indicate like parts in the views, in which—

Figure 1 is a side elevation of my improved pulverizer and clod-cutter. Fig. 2 is a top plan view, and Fig. 3 is an enlarged edge view of one of the colters, showing the opposite faces being parallel.

Reference now being had to the details of the drawings by letter, A designates a shaft of the truck B, and C designates wheels mounted on said shaft. A suitable tongue D is secured to the truck, and E designates a shaft having arms F, connected to the end piece K of the colter-carrying frame, and to the latter is secured a bail-shaped member G, which is bolted or otherwise secured to the front and rear bars K and K' of said colter-frame. Mounted in said colter-frame is a series of shafts L, journaled in suitable bearings in the colter-frame, and in the drawings I have illustrated six of these shafts; but the number may be varied, and they may be of any desired length which may be found best adapted for the use to which they are to be put. Keyed to each of the shafts L are the colter-disks N, each of which has its opposite faces parallel, and said disks are mounted upon the shafts as close together as practicable and in such a manner as to allow the lower portions of the disk to cut through the upper surface of the ground and into the subsoil, whereby clods may be cut up and the ground harrowed in such a manner as to leave the surface of the ground mellow and adapted to receive and hold moisture necessary to the successful germination of the seed.

Pivotally mounted upon a portion of the truck is an operating-lever M, to which is pivotally connected a link R, which in turn is fastened to said bail-shaped member G. A notched segment member S is also mounted on the truck, and a dog Q, which is carried by the operating-lever, is adapted to fit in the various notches of said segment in order to hold the frame carrying the colter-disks at different heights, accordingly as it is desired to have the colters cut a lesser or greater depth into the soil.

From the foregoing it will be observed that by the provision of the arrangement of disk colters, as illustrated, forming essential features of my invention, clods of earth upon the surface of the ground may be cut up, and the top of the ground, as well as the subsoil, is thoroughly cut up without being crushed and put in a suitable condition to receive seed under conditions which are favorable to the rapid germination of the seed.

Having thus fully described my invention, what I claim as new, and desire to secure by Letters Patent, is—

A clod-cutter and pulverizer comprising, in combination with a truck, a shaft E journaled therein, integral and parallel arms F projecting at right angles to said shaft, a colter-carrying frame, brackets fastened to the forward ends of the latter, to which the ends of said arms are pivoted, bails secured to the ends of the frame, operating-levers pivotally mounted on the truck, and links pivotally connecting the bails to said levers, as set forth.

In testimony whereof I hereunto affix my signature in presence of two witnesses.

JOHN P. HOOPS.

Witnesses:
JOHN ENSZ,
EMIL L. RUTH.